Sept. 24, 1963
C. R. KEMPER
3,104,423
MOLDING MACHINE
Filed May 16, 1961
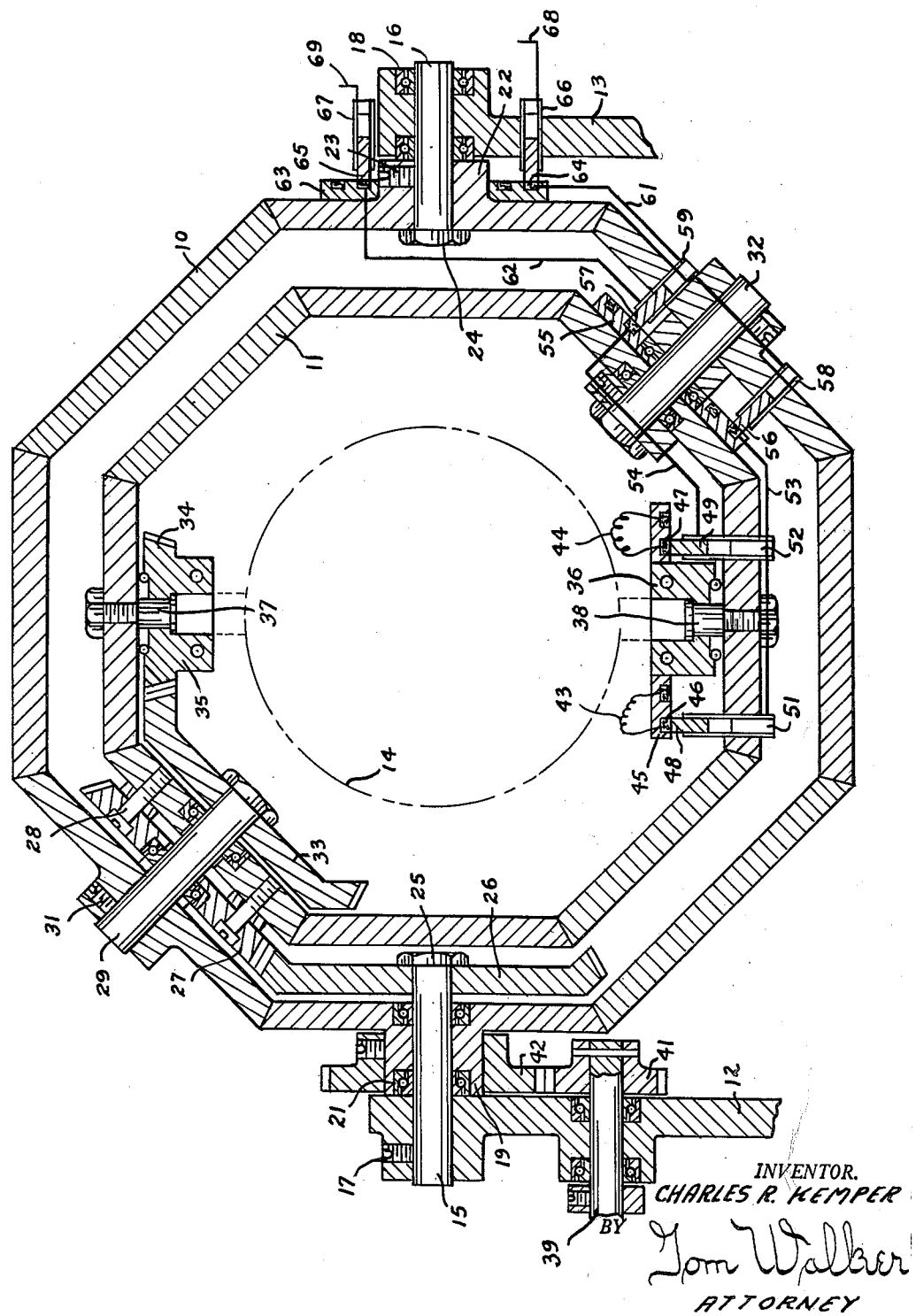
INVENTOR.
CHARLES R. KEMPER
BY Tom Walker
ATTORNEY 3,104,423
MOLDING MACHINE
Charles R. Kemper, 500 Canterbury Drive,
Dayton, Ohio
Filed May 16, 1961, Ser. No. 110,493
10 Claims. (Cl. 18—26)

This invention relates to apparatus producing in a held article a combination of rotational and gyrational motions in a generally new mechanical movement. Although of varied application, as for example in experimental work with centrifugal-like effect or for the admixture and dispersion of materials, the invention is useful as a molding or casting machine in the manufacture of hollow articles made of plastic materials.

Machines of the class described operate upon a mold, charged with a quantity of liquid plastic, to rotate the mold in a plurality of planes whereby the contained liquid may flow to the wall of the mold and form the shell of the article being made. In the case of thermal setting plastics heat is applied to set the liquid in its shell form.

The object of the invention is to simplify the construction as well as the means and mode of operation of such machines, whereby such machines may not only be economically manufactured, but will be more efficient and satisfactory in use, adaptable to a wide variety of application, and be unlikely to get out of order.

A further object of this invention is to improve upon machines of this class with the view of achieving a more evenly distributed flow of the liquid plastic under generated forces, resulting in a finished article of more uniform wall thickness. According to a feature of the invention provision is made not only for rotating the mold in a compound motion but for rotating it in the different planes at differential speeds whereby the mold moves through its plurality of planes under conditions of progressively changing attitude.

Another object of the invention is appreciably to simplify the construction of molding machines as described in a manner obviating the use of conveyers, cams and the extensive structural organizations of the prior art.

Another object of the invention is to eliminate the use of external heat applying means while retaining a means to heat thermal setting plastics during rotation of the mold.

Still another object of the invention is to present a generally new molding machine especially characterized by compactness and simplicity and operating in the confines of a fixed spherical plane.

A still further object of the invention is to provide a new mechanical movement in apparatus of general utility as described.

A further object of the invention is to provide a machine possessing the advantageous structural features, the inherent meritorious characteristics and the mode of operation herein mentioned.

With the above and other incidental objects in view as will more fully appear in the specification, the invention intended to be protected by Letters Patent consists of the features of construction, the parts and combinations thereof, and the mode of operation as hereinafter described or illustrated in the accompanying drawings, or their equivalents.

Referring to the accompanying drawing wherein is shown one but obviously not necessarily the only form of embodiment of the invention, The drawing is a view in longitudinal section of apparatus in accordance with the illustrated embodiment of the invention, the device shown being a molding machine at the center of which is the mold area.

Like parts are indicated by similar characters of reference throughout the several views.

Referring to the drawing, a molding machine in accordance with the illustrated embodiment of the invention has the character of a gimbal-like device wherein outer and inner concentric rings 10 and 11 are supported for rotation about different axes. The assembly comprising the rings 10 and 11 is supported between a pair of stationary brackets 12 and 13 and the mold area is defined at the center of such assembly as indicated by the broken line 14. The rings 10 and 11 have an angular configuration to provide increased interior space to receive an elongated mold and for a more facile accommodation of gearing, as will hereinafter more clearly appear. The rings are unitary and may conveniently be fabricated from plates or bar stock welded together at their ends.

Considering the illustrated structure in more detail, each bracket 12 and 13 carries an inwardly projecting stud or trunnion 15 and 16 respectively, the trunnions being in diametrically opposed relation. Trunnion 15 is secured to its bracket 12, as by set screw means 17. Trunnion 16 is rotatable in bearings 18 in the bracket 13. The trunnion 15 extends through and beyond a hub 19 of the outer ring 10, bearings 21 in the hub 19 providing for free relative rotation of the outer ring. The trunnion 16 extends through and beyond a hub 22 on the outer ring 10 and is secured thereto, as by means of set screw means 23. A head 24 on the trunnion 16 abuts the inner surface of the ring 10. On the inner projecting end of the trunnion 15, immediately in advance of a head 25 thereon, is a gear 26. Positioned between the outer ring 10 and inner ring 11 the gear 26 is secured to the trunnion 15 in suitable fashion to occupy a stationary position relative to the rotary ring 10. In meshing engagement with the gear 26 is another gear 27 secured by means including screw studs 28 to the outer surface of inner ring 11. Further, both the gear 27 and the inner ring 11 have a rotary bearing on another trunnion 29 installed in the outer ring 10 to project inwardly or radially toward the mold area and fixed to the outer ring by suitable means such as set screw means 31. The trunnion 29 is in circumferentially offset relation to the trunnion 15 and is diametrically opposed by a like trunnion 32 also installed in the outer ring 10 in a rigid manner to project inwardly to and through the inner ring 11.

On the inner projecting end of the trunnion 29, and relatively fixed thereto, is a gear 33. In meshing engagement with the periphery of gear 33 is another gear 34 forming part of a body 35 adapted to achieve clamping engagement in a manner not fully shown herein with a mold occupying the mold area 14. In complementary relation to the body 35, and supporting the other end of a mold is a body 36. Both bodies 35 and 36 are connected to the inner ring 11 to be carried thereby inwardly thereof adjacent to the mold area 14. Respective bearing devices 37 and 38 are fixed to the ring 11 and provide rotary mounts for the bodies 35 and 36 which are freely rotatable relative thereto.

The bodies 35 and 36 provide an axis of rotation for a supported mold which is in circumferentially offset relation both to the axis of rotation of the inner ring 11, as defined by the trunnions 29 and 32, and to the axis of rotation of the outer ring 10 as defined by the trunnions 15 and 16. The rotation of the rings and of the mold supports is simultaneous by reason of the continuous meshing engagement of the several described gears. A force for rotation of the described elements is brought to the machine through a power driven rotary shaft 39 having a bearing in the bracket 12 and having a gear 41 secured thereto. The gear 41 is in meshing engagement with a gear 42 secured to hub 19 of the outer ring 10.

In response to rotation of the shaft 39, therefore, gear 42 is made to rotate causing outer ring 10 to turn in its supports on brackets 12 and 13. The axis of rotation of the outer ring is about the trunnions 15 and 16. The trunnions 29 and 32 are carried with the outer ring 10 in its rotation and so revolve about the axis of the outer ring carrying with them the inner ring 11. The gear 27 on the inner ring 11 accordingly moves in planetary fashion about the stationary gear 26, and, in addition is caused to rotate about its own axis by virtue of its meshing engagement with the stationary gear. Hence the inner ring 11 has a compound motion turning simultaneously about an axis defined by the trunnions 29 and 32 and revolving simultaneously in another plane by reason of its support in the rotating ring 10. The mold supports 35 and 36 partake of the compound motion of the inner ring 11 and at the same time have additional motion of their own as the gear 34 travels in planetary fashion about the gear 33 with which it meshes. A supported mold is adapted to be connected to the supports 35 and 36 for unison rotation therewith. It accordingly is subjected simultaneously to the rotational effect imparted by these devices and to the compound motion through which ring 11 passes. The result is a rotary movement of the supported mold simultaneously in a plurality of planes in such manner as to produce a highly uniform distributing effect upon a charge of liquid plastic in the mold whereby it may flow evenly to the limits of the mold cavity and define a wall of uniform thickness.

Accomplishing a more general and equal application of the distributing forces the mold is, in accordance with the instant invention, caused to pass through its plurality of planes under conditions of progressively changing attitude. The described gear drive is constructed to obtain differential speeds of rotation as between the inner and outer gears and with respect to the mold supports 35 and 36. The planetary gear 27 is smaller in diameter than stationary gear 26. Therefore, in completing one revolution about the gear 26 the planetary gear 27 completes more than one full revolution about its own axis. The speed of rotation of the inner ring 11 accordingly is greater than that of the outer ring 10. Similarly, gear 34 on body 35 is smaller in diameter than gear 33 so that the rotation of body 35 and the supported mold is relatively greater than the speed of rotation of the ring 11. As a result of such differential speeds, as noted, the mold occupies a progressively changing and different attitude in each turn in its plurality of planes. Change speed devices of various kinds can be provided to effect this result and, of course, the differential may be in a decreasing direction instead of increasing or may be a combination of the two.

In the use of thermal setting plastic materials it is desirable to heat the mold during its rotation in order that the outwardly thrown material will set and hold the defined configuration. While heat lamps and other external heat applying means may be used the present invention contemplates a direct heating of the mold by electrical resistance coils, for example by coils 43 and 44 diagrammatically shown projecting into the mold area 14. These coils are mounted on a disc or slip ring 45 rotatable on the support 36 and adapted to be connected to the supported mold. The ring 45 contains on its underside concentric electrically conductive rings 46 and 47 bridged by the resistance coils 43 and 44. Electrically conductive brushes 48 and 49 are in contact with the respective rings 46 and 47 and are slidably mounted in respective electrically conductive channel members 51 and 52 carried by the inner ring 11 and insulated therefrom in a suitable manner. Electrical conductors 53 and 54 connect the channel members 51 and 52 to another ring 55 like the disc or ring 45 and secured to the outer surface of ring 11. Brushes 56 and 57 maintain electrical contact with the ring 55 and their respective channel carriers 58 and 59 are carried by the outer ring 10. Conductors 61 and 62 lead from the channel members 58 and 59 to a further slip ring 63 mounted to the exterior of outer ring 10. Brushes 64 and 65 contact the ring 63 and are slidable in channel members 66 and 67 mounted in stationary bracket 13. Conductors 68 and 69 supply electrical current to the machine from a suitable source. The construction and arrangement of parts is one designed to supply electrical current to the heating coils 43 and 44 continuously or at will during operation of the machine and irrespective of the compound motion of certain machine parts. The heating system may be adapted for single or multi-phase operation and may likewise be selectively adapted for control by thermally sensitive means.

The forces exerted in the mold area are particularly suited, as seen, to the molding of hollow articles and the like from a flowable plastic material. The apparatus is not limited, however in the kind of article or container rotated, having, as heretofore noted, general application to any field in which a mechanical movement as disclosed may advantageously be used.

As an example of such other fields, the present apparatus, with an appropriate container supported therein in place of the mold, may be used as a blender, polisher, or tumbler in connection with dry materials, liquids, gases or combinations thereof. Again, with an appropriate container supported either centrally or eccentrically therein, the apparatus may be used to produce beneficial kinetic effects on biological processes and materials.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise but one of several modes of putting the invention into effect, and the invention is therefore claimed in any of its forms or modifications within the legitimate and valid scope of the appended claims.

Having thus described my invention, I claim:

1. Apparatus of the class described, comprising article support means and a mount for said support means, said mount including means for rotating said support means about one axis the orientation of which is fixed and simultaneously about additional different axes the orientation of which constantly changes and at different speeds about different axes to achieve motion of a supported article in different planes under conditions of progressively changing attitude.

2. Apparatus of the class described, including a pair of concentric rings, relatively rotatable article support means on the inner one of said rings for supporting an article at the center of said pair of rings, said support means defining an axis of rotation for motion of the article in a first plane, trunnion means stationary with respect to the outer ring and supporting said inner ring for relative rotation on an axis different from the axis of rotation defined by said support means to effect a motion of the article in a second plane, means supporting said outer ring for rotation in still another axis to carry said inner ring in a revolving movement effecting motion of the article in a third plane, and means for simultaneously rotating said rings and said article support means.

3. Apparatus according to claim 2, characterized in that said last named means includes means obtaining differential speeds of rotation of said rings and of said article support means.

4. Apparatus according to claim 2, characterized by brush and slip ring connections between said rings for conducting an electrical current to the center of said pair of rings for heating of the article.

5. Apparatus of the class described, including a gimbal-like device having a pair of concentric rings supported for rotation about different axes, the inner ring being carried by the outer ring, article support means carried by the inner ring for rotation about an axis different from the axes of said rings, means for rotating said outer ring, means interconnected with said inner ring to induce a rotation thereof relative said outer ring at a relatively different speed and means having a fixed relation to the outer ring interconnected with said article support means to induce a relative rotation thereof with reference to both said rings, a simultaneous rotation of said rings and said support means producing a compound motion of a supported article in a plurality of planes and at different speeds in different planes.

6. Apparatus of the class described, including a stationary frame, trunnion means stationarily installed in said frame, a stationary gear on said trunnion means, a gimbal-like outer ring rotatably mounted on said trunnion means, other trunnion means stationarily installed in said outer ring in circumferentially offset relation to the first said trunnion means, an inner ring rotatably mounted on said other trunnion means, a planetary gear fixed to said second ring and meshing with the relatively stationary gear, another stationary gear on said other trunnion means, relatively rotatable support means on said inner ring in an axis circumferentially offset from the axes of both said trunnion means, said support means including another planetary gear meshing with said other stationary gear, and means for rotating said outer ring.

7. Apparatus according to claim 6, characterized in that the gear connections as defined are constructed to obtain differential speeds of rotation of said rings and said support means.

8. Apparatus according to claim 6, characterized in that said planetary gears are different in size from the respective stationary gears with which they mesh to achieve a different speed of rotation of said inner ring relative to said outer ring and a different speed of rotation of said support means relative to said inner ring.

9. Apparatus according to claim 6, characterized by brush and slip ring connections extending from said frame to said outer ring from said outer ring to said inner ring and from said inner ring to said support means conducting electrical current for heating a supported article.

10. A molding machine including a unitary device defining an enclosure at the center of which is a mold area, said device comprising inner and outer relatively rotatable concentric rings, relatively rotatable mold support means on the inner periphery of the inner ring projecting radially inward toward the mold area, heating coil means rotatably mounted on said support means and adapted to be connected to the supported mold, means for rotating said rings and said support means in different rotational planes, and means for conducting electrical current to said coil means for heating during rotation thereof.

References Cited in the file of this patent
UNITED STATES PATENTS

| | | |
|---|---|---|
| 2,659,107 | De Bell | Nov. 17, 1953 |
| 2,967,329 | Friedland et al. | Jan. 30, 1961 |